(12) United States Patent
Lakshmanachar et al.

(10) Patent No.: US 8,131,686 B2
(45) Date of Patent: Mar. 6, 2012

(54) DATA MIGRATION FACTORY

(75) Inventors: Muralidharan Lakshmanachar, Bangalore (IN); Narasimha Gopalarao Anand, Bangalore (IN); Mahankali V N S S Mohan, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 349 days.

(21) Appl. No.: 12/115,548

(22) Filed: May 6, 2008

(65) Prior Publication Data

US 2009/0282089 A1   Nov. 12, 2009

(51) Int. Cl.
*G06F 7/00* (2006.01)
(52) U.S. Cl. ....................................................... 707/682
(58) Field of Classification Search .................. 707/678, 707/682

See application file for complete search history.

(56) References Cited

U.S. PATENT DOCUMENTS

| | | | |
|---|---|---|---|
| 2007/0011422 A1* | 1/2007 | Srinivasan et al. | 711/165 |
| 2009/0119476 A1* | 5/2009 | Jernigan et al. | 711/204 |
| 2009/0282089 A1* | 11/2009 | Lakshmanachar et al. | 707/204 |

* cited by examiner

*Primary Examiner* — Truong Vo
(74) *Attorney, Agent, or Firm* — Prakash Nama; Global IP Services, PLLC

(57) ABSTRACT

A method, apparatus and system for data migration is disclosed. In one embodiment, the method includes staging data associated with a legacy system, mapping the data, integrating a tool to facilitate migration of the data, viewing and correcting records associated with the data, and moving the records from the legacy system to a target system. The staging data associated with the legacy system may include discovering and identifying issues associated with data migration, defining a combination of locations, servers, and data migration objects, managing the data migration objects, extracting data from a source, initially and incrementally loading the data into a staging area, and enabling history tracking for incremental data processing.

21 Claims, 12 Drawing Sheets

MIGRATION ENVIRONMENT 100

DATA MIGRATION FACTORY

FIELD OF THE INVENTION

The present invention relates to data migration, and more specifically to a data migration system and method for migrating application data from legacy systems to target systems.

BACKGROUND

Application migration projects are sometimes undertaken to rationalize existing legacy applications. Such projects entail migration of data from legacy systems to target systems. Such efforts may be undertaken, for example, in an attempt to maintain business continuity, retain historical data, increase efficiency, enhance returns on investments, etc.

Application migration projects, however, can be very complex. Some projects may fail due to various data migration issues. These issues may be related to the effort-intensive nature of the project, and include overextension of legacy and target migration teams. More particularly, projects tasks such as identifying data issues, fixing errors, and mapping legacy data elements to target data elements may be poorly defined. Such tasks are typically handled using cumbersome manual processes, which may be prone to defects.

Further, accessing and understanding the legacy systems may require specialist skill sets. The legacy systems may lack up-to-date documentation. The migration of multiple systems may require resolving complicated redundancies and inconsistencies. There may also be iterative "try and learn" design processes; unmanageability issues; and delays associated with hand-coding. Given the foregoing, the failure rate of application migration projects may be significant.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus and system of data migration is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
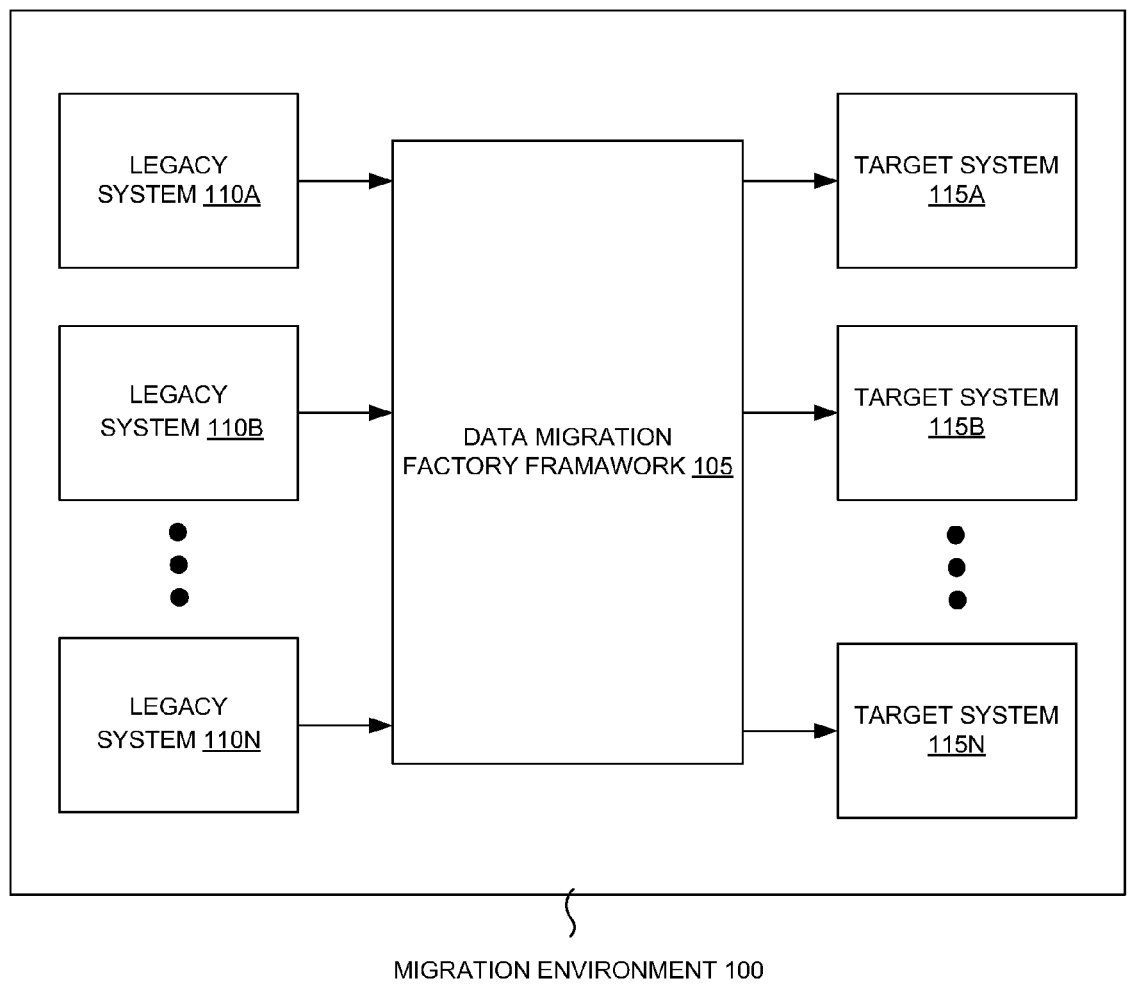
FIG. 1 illustrates a migration environment for data migration in enterprise systems, according to one embodiment.

FIG. 1 illustrates a migration environment 100 for data migration in enterprise systems, according to one embodiment. Particularly, FIG. 1 illustrates a data migration factory framework 105, legacy systems 110A-C and target systems 115A-B.

The migration environment 100 is an automated migration environment that enables transferring data from the legacy systems 110A-C to the target systems 115A-B. The data migration factory framework 105 applies a factory approach to the data migration process. The legacy systems 110A-C may include old application programs that continue to be run in computer systems. The target systems 115A-B may include application programs, computer systems, etc. to which the data is transferred from the legacy system 110A-C. The migration environment 100 accomplishes data migration with the help of the data migration factory framework 105 that streamlines the data migration process.

Figure 2:
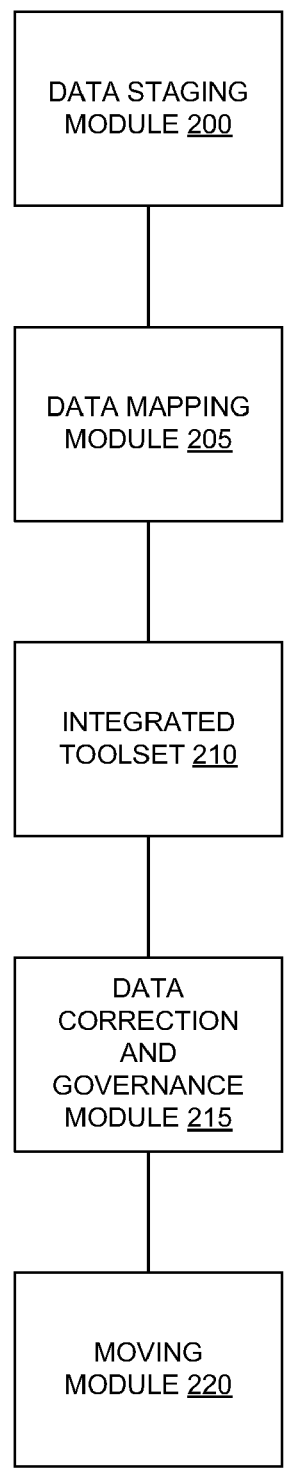
FIG. 2 illustrates various modules associated with the data migration factory environment, according to one embodiment.

FIG. 2 illustrates various modules associated with the data migration factory environment 105, according to one embodiment. Particularly, FIG. 2 illustrates a data staging module 200, a data mapping module 205, an integrated toolset 210, a data correction and governance module 215 and a moving module 220.

The data staging module 200 stages data associated with at least one legacy system 110. The data mapping module 205 maps the data. In some embodiments, the data is mapped between the legacy systems 110A-C and the target systems 115A-B to minimize data migration errors. The integrated toolset 210 facilitates migration of the data from the legacy systems 110A-C to the target system 115A-B in the migration environment 100. In one embodiment, the integrated toolset 210 has at least one tool to facilitate the migration of the data. The data correction and governance module 215 views and corrects records associated with the data. The moving module 220 moves the records from the at least one legacy system 110 to at least one target system 115.

Figure 3:
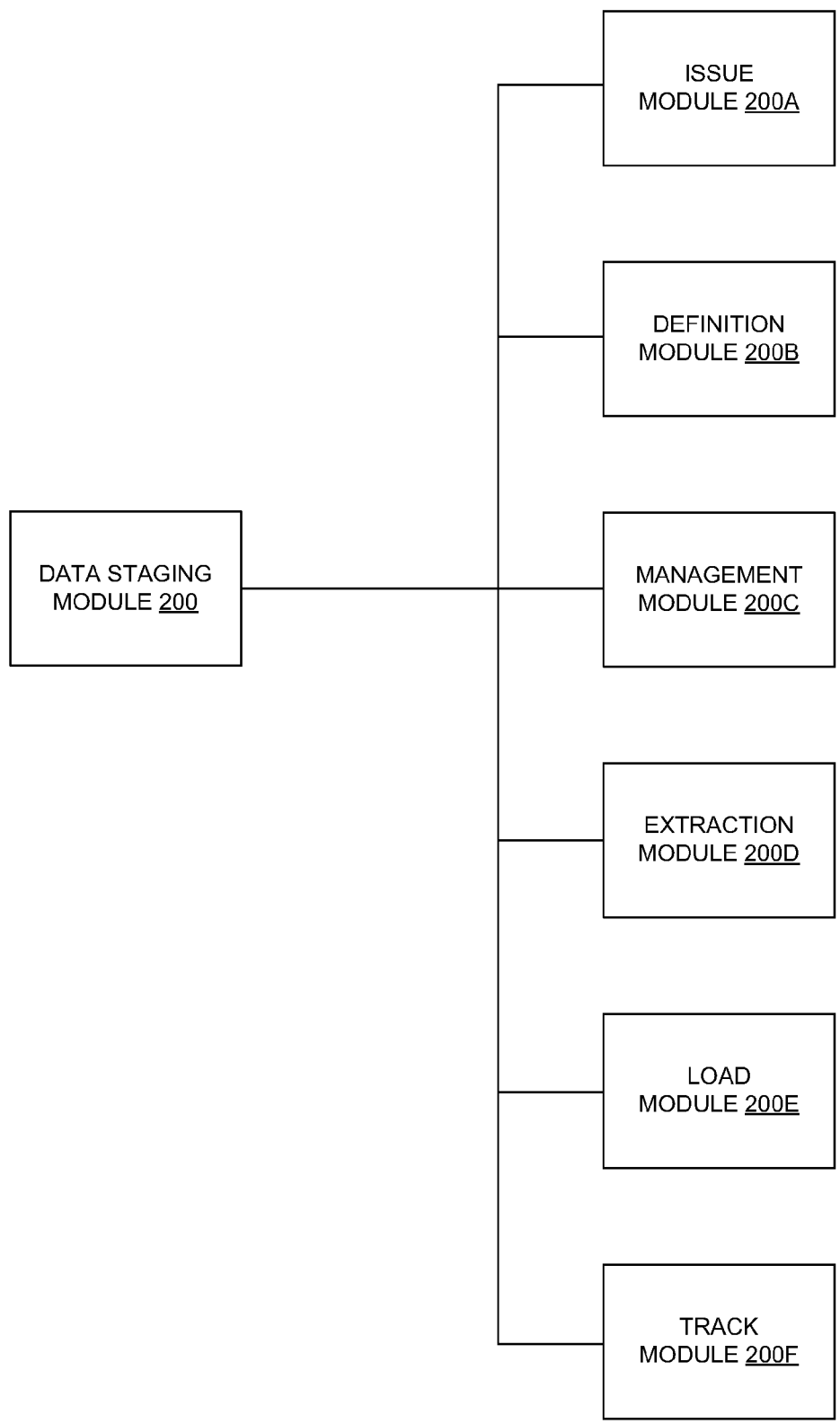
FIG. 3 illustrates various modules associated with the data staging module of FIG. 2, according to one embodiment.

FIG. 3 illustrates various modules associated with the data staging module 200 of FIG. 2, according to one embodiment. Particularly, FIG. 3 illustrates an issue module 200A, a definition module 200B, a management module 200C, an extraction module 200D, a load module 200E and a track module 200F.

The issue module 200A discovers and identifies issues associated with the data migration. In some embodiments, data analysis or profiling framework is performed to identify data issues. The definition module 200B defines at least one combination of locations, servers, and data migration objects using data factory tool. The management module 200C manages the data migration objects. The extraction module 200D extracts data from at least one source. In some embodiments, commercial ETL (extract, transform, load) tools and java based components are used for data extraction. The load module 200E initially and incrementally loads the data into a staging area. The track module 200F enables history tracking for incremental data processing.

In some embodiments, the data staging module 200 enables data from disparate legacy sources to be integrated in one solution, edit data using a business view of data defined by the subject matter experts (SMEs). Further, the data staging module 200 utilizes tools to enable faster development of transformation rules. Also, the data staging module 200 supports use of cleansing tool to correct and standardize complex objects such as customer and product and utilization of third party service providers such as D&B. Thus, the data staging module 200 enables data to be profiled and prepared in advance, reducing workload on legacy teams.

Figure 4:
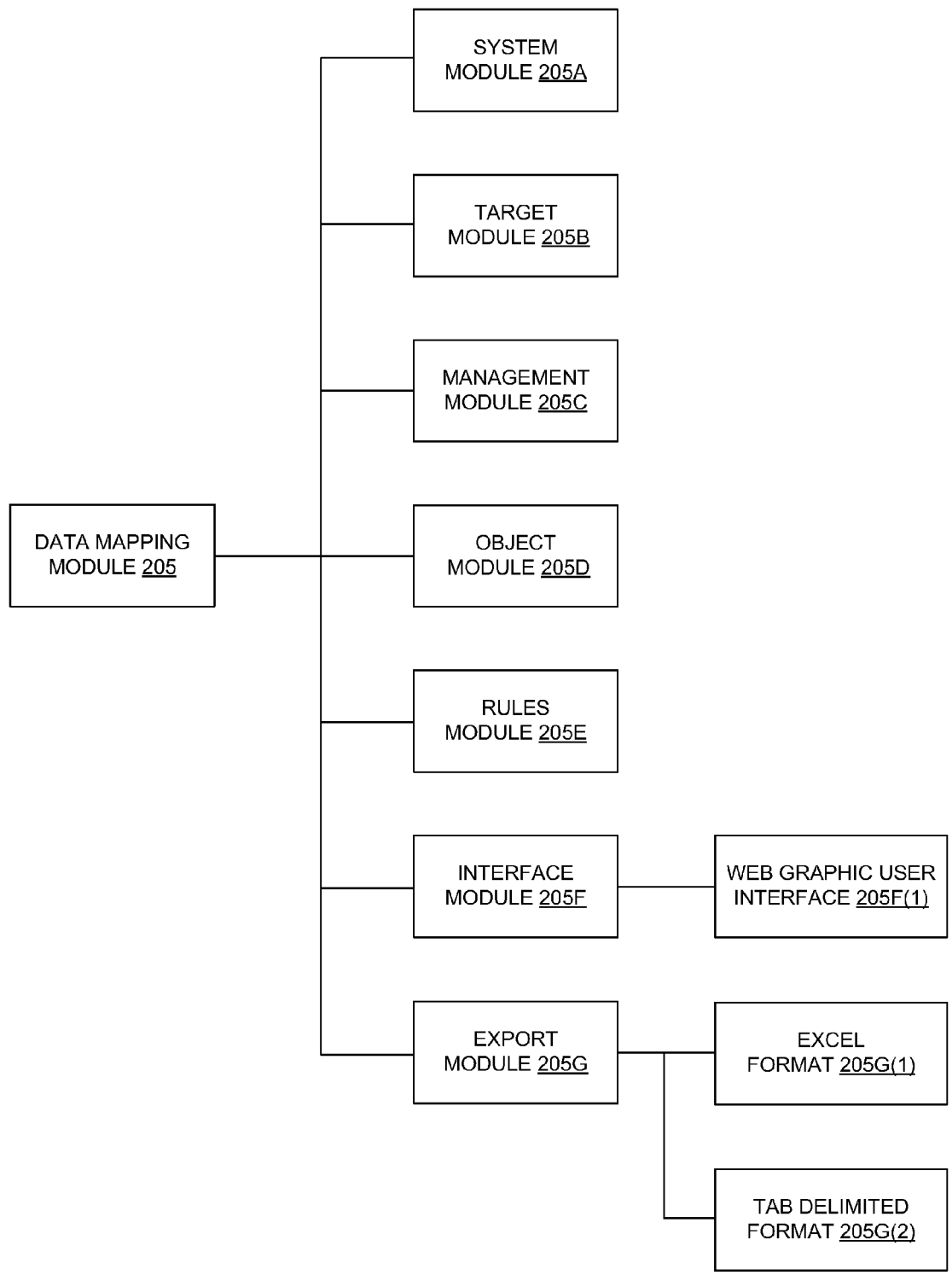
FIG. 4 illustrates various modules associated with the data mapping module of FIG. 2, according to one embodiment.

FIG. 4 illustrates various modules associated with the data mapping module 205 of FIG. 2, according to one embodiment. Particularly, FIG. 4 illustrates a systems module 205A, a target module 205B, a management module 205C, an object module 205D, a rules module 205E, an interface module 205F and an export module 205G.

The systems module 205A maps data between a legacy system 110 and a target system 120. The target module 205B manages target structures and hierarchies. The management module 205C manages legacy structures, target structures, and hierarchies. The object module 205D maps object level data. The rules module 205E defines transformation rules associated with the data. The interface module 205F provides an interface associate with mapping management and version control. For example, the interface includes a web graphic user interface (GUI). The export module 205G exports the data mappings into at least one predetermined format. For example, the predetermined format includes an excel format and a tab delimited format.

In some embodiments, the data mapping module 205 provides a single place for defining and managing conversion specifications and provides version control capability to manage changes in specification. The data mapping module 205 also enables re-use of specifications from past conversions and exports specifications in spreadsheet form to be used by data migration developers and SMEs. Further, the data mapping module 205 defines the metadata to enable business object view of data.

Figure 5:
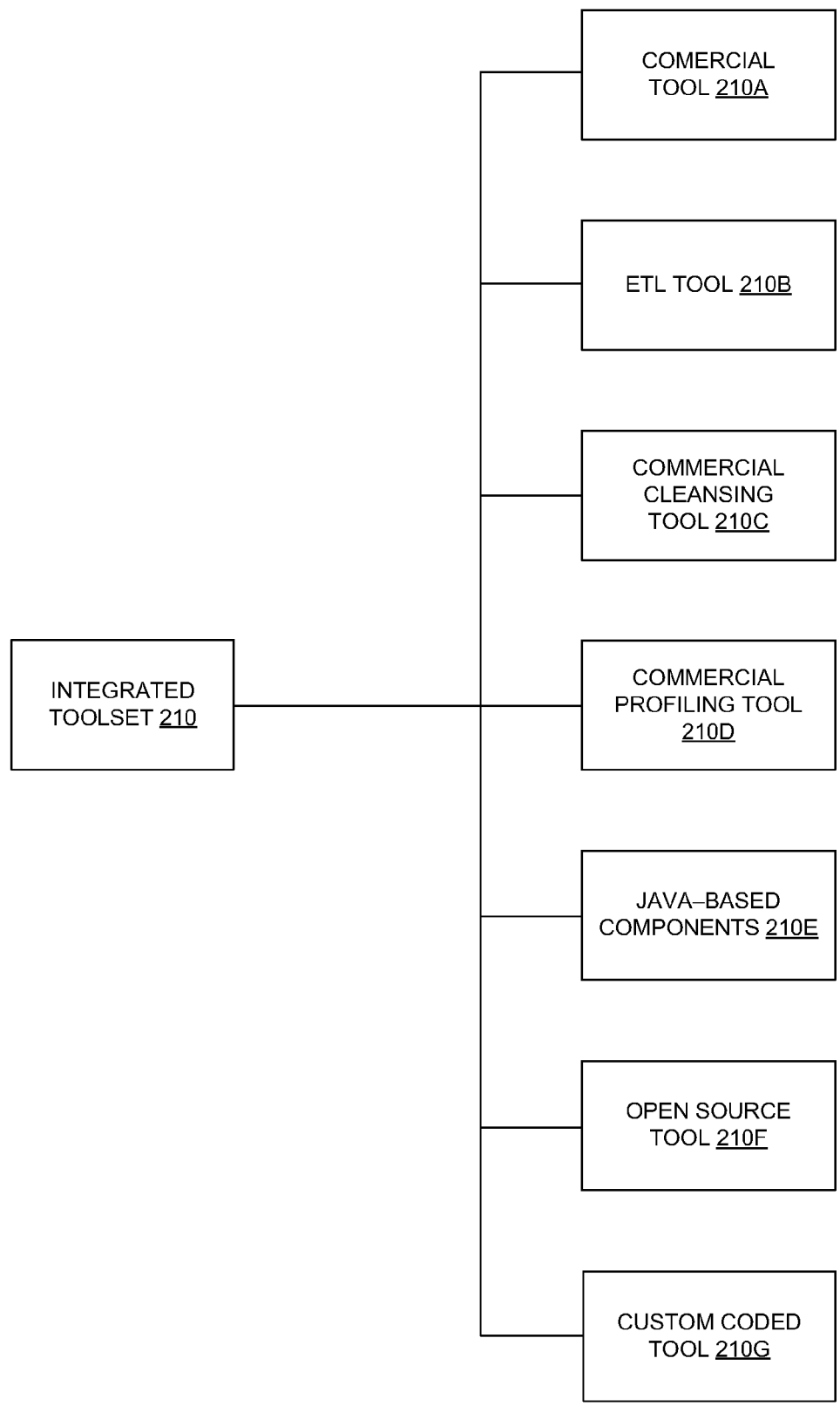
FIG. 5 illustrates various tools associated with the integrated toolset of FIG. 2, according to one embodiment.

FIG. 5 illustrates various tools associated with the integrated toolset 210 of FIG. 2, according to one embodiment. Particularly, FIG. 5 illustrates a commercial tool 210A, an ETL tool 210B, a commercial cleansing tool 210C, a commercial profiling tool 210D, Java-based components 210E, an open source tool 210F and a custom-coded tool 210G.

In some embodiments, the integrated toolset 210 utilizes commercial ETL, cleansing and profiling tools for data migration. The integrated toolset 210 also utilizes data factory tool and enables data factory application integration with commercial ETL and data cleansing tools for data migration management and data quality management. Java based components convert complex legacy data formats from EBCDIC (extended binary coded decimal interchange code) to ASCII (American standard code for information interchange). Thus, the integrated toolset 210 supports use of ETL and data cleansing tools to support data migration process. Further, the integrated toolset 210 provides a single entry point of control for the migration process and streamlines the data loading process by grouping related elements under migration objects. Also, the integrated toolset 210 enables components to be re-used in multi-location rollout programs.

Figure 6:
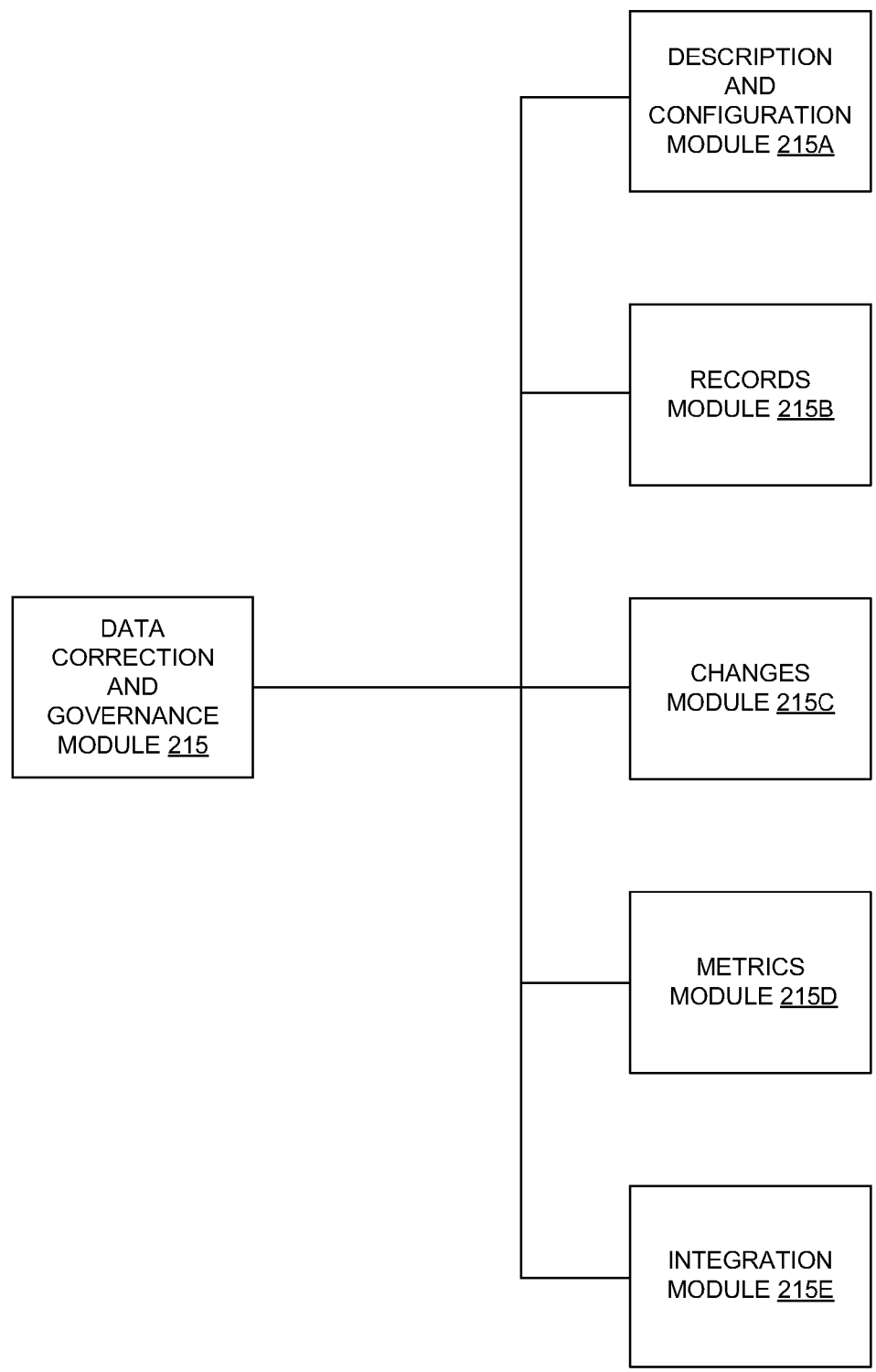
FIG. 6 illustrates various modules associated with the data correction and governance module of FIG. 2, according to one embodiment.

FIG. 6 illustrates various modules associated with the data correction and governance module 215 of FIG. 2, according to one embodiment. Particularly, FIG. 6 illustrates a description and configuration module 215A, a records module 215B, a changes module 215C, a metrics module 215D and an integration module 215E.

The description and configuration module 215A describes and configures legacy migration elements and target structures at an object level. The records module 215B views and edits the records and is moved from the legacy to the target structures. The changes module 215C audits and tracks changes to the data. The metrics module 215D generates data quality and processing metrics. The integration module 215E integrates the records and at least one tool.

In some embodiments, the data correction and governance module 215 automatically generates GUI screens for viewing and correcting legacy data. Further, different business views of data (e.g., open contracts, closed contracts, etc.) are enabled through the data correction and governance module 215. The data correction and governance module 215 also enables controlled management of data correction with role based privileges and change audit. Further, the data correction and governance module 215 provides data owners, ability to check change history and play back old corrections, if required.

Figure 7:
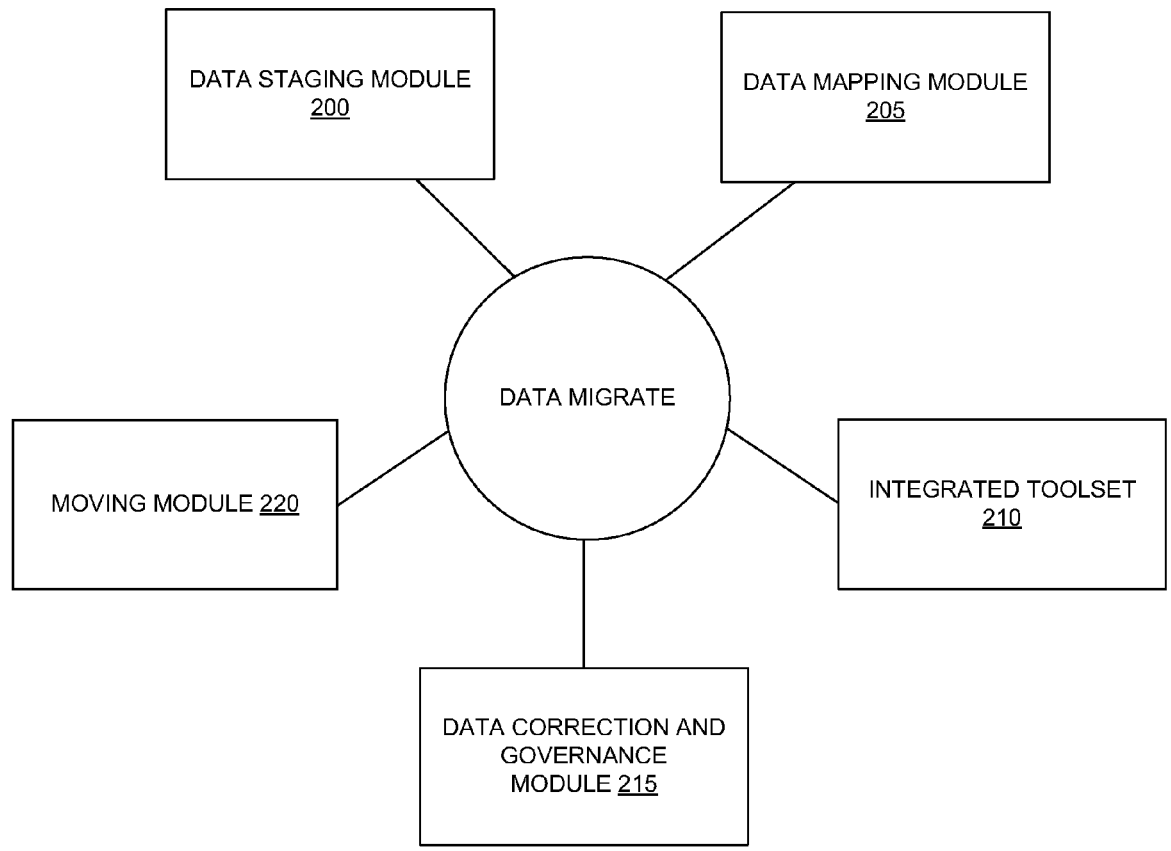
FIG. 7 illustrates the data migration factory framework in the migration environment, according to one embodiment.

FIG. 7 illustrates the data migration factory framework 105 in the migration environment 100, according to one embodiment. Particularly, FIG. 7 illustrates the data staging module 200, the data mapping module 205, the integrated toolset 210, the data correction and governance module 215 and the moving module 220.

In some embodiments, the data migration factory framework 105 applies factory approach to the data migration process. In this embodiment, the data migration factory framework 105 utilizes an integrated toolset and methodology for the data migration management, data quality management and ETL. The integrated toolset enables better control over data migration process. For example, the data migration factory framework 105 uses commercial tools for ETL, profiling and cleansing tools, as well as data factory tools, for defining mapping at the object level and automating manual data correction process and records movement to the target structures. Integrating the data factory tool with commercial ETL and cleansing tools provides the power and flexibility to the data migration management and data quality management. In various embodiments, the data factory tool(s) may be interrogated with any type of tools, e.g., open source or custom-coded tools.

Further, the data migration factory framework 105 applies factory approach to the data migration process and streamlines the data migration process. Resource optimization and active knowledge management are the key enablers of the data migration factory framework 105. Tool driven approach incorporating robust processes and best practices help achieve consistent and improved data quality, faster data conversion and reduced overall cost. The data migration factory framework 105 identifies legacy data issues in advance and avoids expensive project overruns.

Complex legacy objects are viewed as a unit and corrections are applied through web enabled GUI front end. Changes to data are tracked and the data governance program is implemented through an application provided workflow. The data migration factory framework 105 ensures support for mapping specification. Further, the data migration factory framework 105 establishes repeatable and reusable data migration processes and reduces data migration effort in the legacy environment up to 50%.

Figure 8:
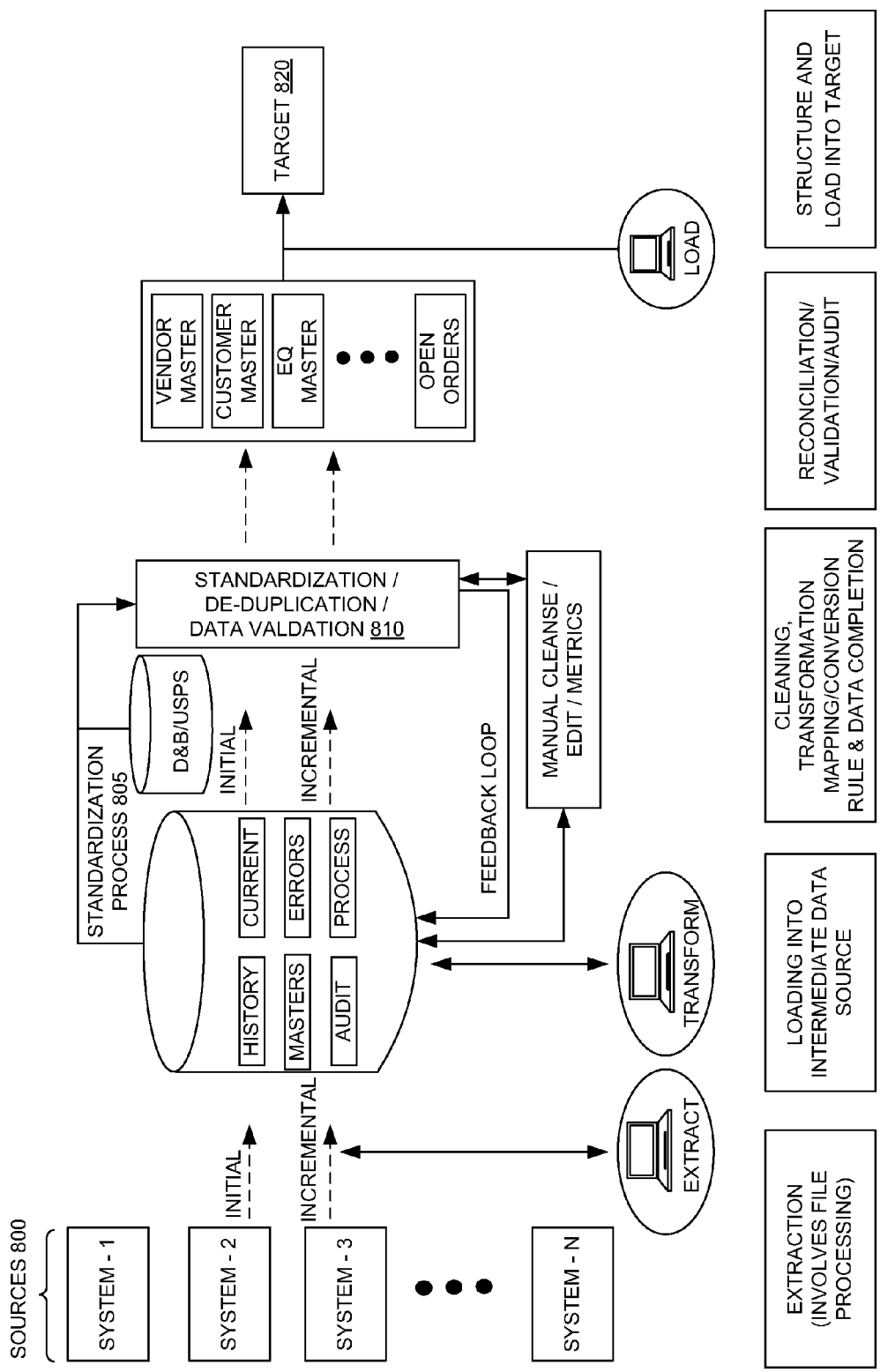
FIG. 8 illustrates a centralized, tool driven approach for data migration from various legacy systems into a single enterprise instance, according to one embodiment.

FIG. 8 illustrates a centralized, tool driven approach for data migration from various legacy systems into a single enterprise instance, according to one embodiment. Particularly, FIG. 8 illustrates data migration from source 800 to target 820.

In some embodiments, the data in the legacy system is staged. In these embodiments, the data is extracted (e.g., involves file processing) from the source 800 and initially and incrementally loaded into the staging area which is an intermediate data store. The data then passes through a standardization process 805. During standards management, the data is processed and audited. The data is manually cleansed, edited and maintained in the history by the data migration factory framework 105.

Further, the data migration factory framework 105 enables changes suffered by a specific record to be checked as well as an option to rollback to previous data. After the standardization process 805, process of data validation 810 occurs to validate, reconcile, de-duplicate and audit the standardized data. Further, reference data 815 such as vendors, customers, open orders, etc. are integrated into the standardized data and are loaded into target system 820. Finally, the application is deployed in the target system 820.

Figure 9:
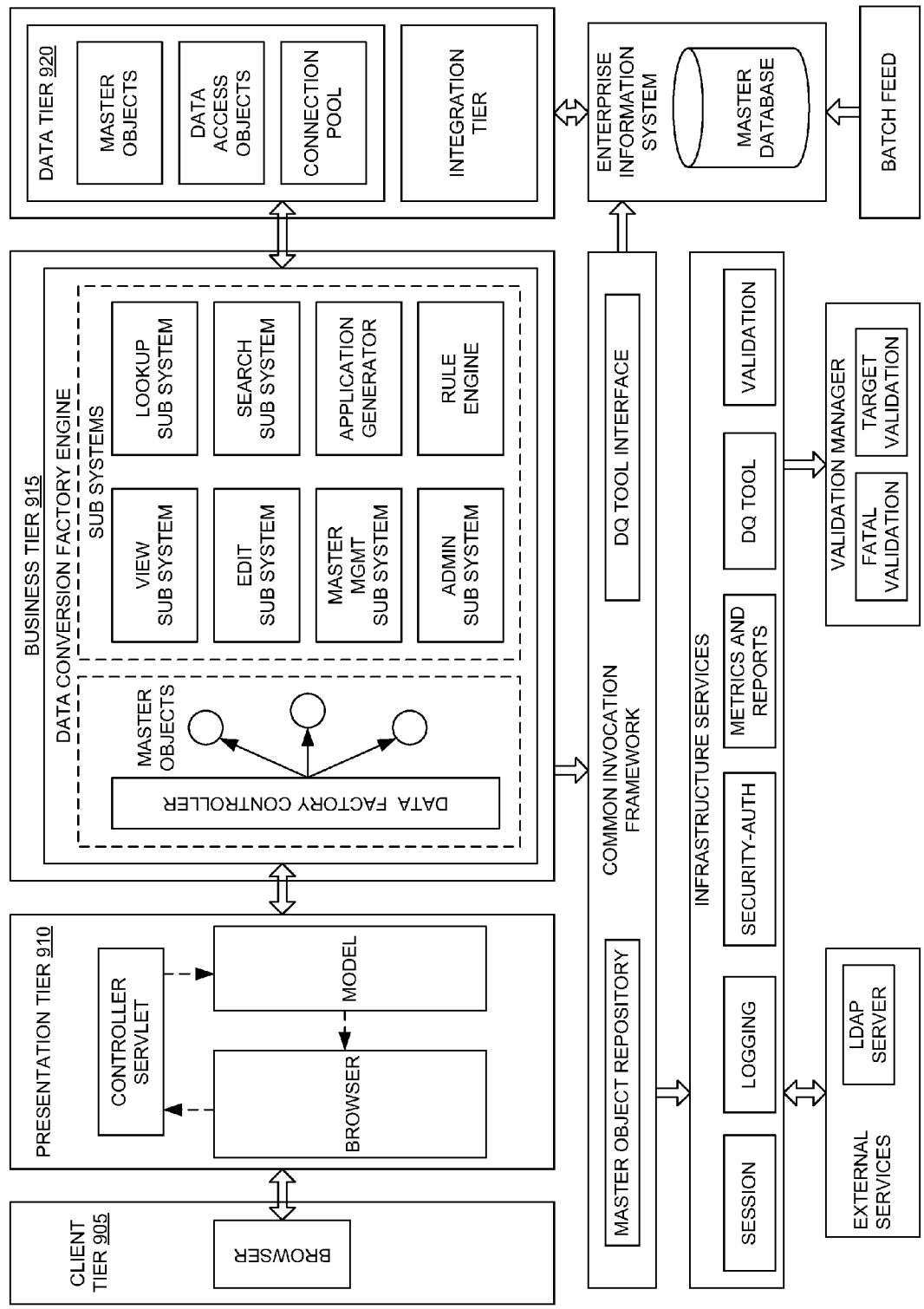
FIG. 9 illustrates an architectural view of the data migration factory, according to one embodiment.

FIG. 9 illustrates an architectural view of the data migration factory, according to one embodiment. The architecture outlines state of the art philosophy of architecting solutions based on separation of concerns across the layers. Particularly, FIG. 9 illustrates a client tier 905, a presentation tier 910, a business tier 915 and a data tier 920.

The business tier 915 includes various subsystems such as application generator, view subsystem, edit subsystem, master management subsystem, lookup subsystem, search subsystem and rule engine that make up the data migration factory solution. A data management console application, which may be required by the review and edit subsystems, facilitates the task of human intervention to ensure data accuracy and consistency. The application allows data stewards to identify data quality issues, rectify the issues, validate the correction and prepare data for load into the application.

Metadata driven data migration factory framework 105 simplifies the data management console application by defining standard patterns of structure and operations followed by data elements and leverages the development of an application which is easily configured to support any future requirements. The data management console application also assists in defining and managing mapping specifications. The data management console application may be implemented, for example, using the Industry standard J2EE (Java 2 enterprise edition) architecture and may be installed using a standard installer, provided with the application.

Figure 10:
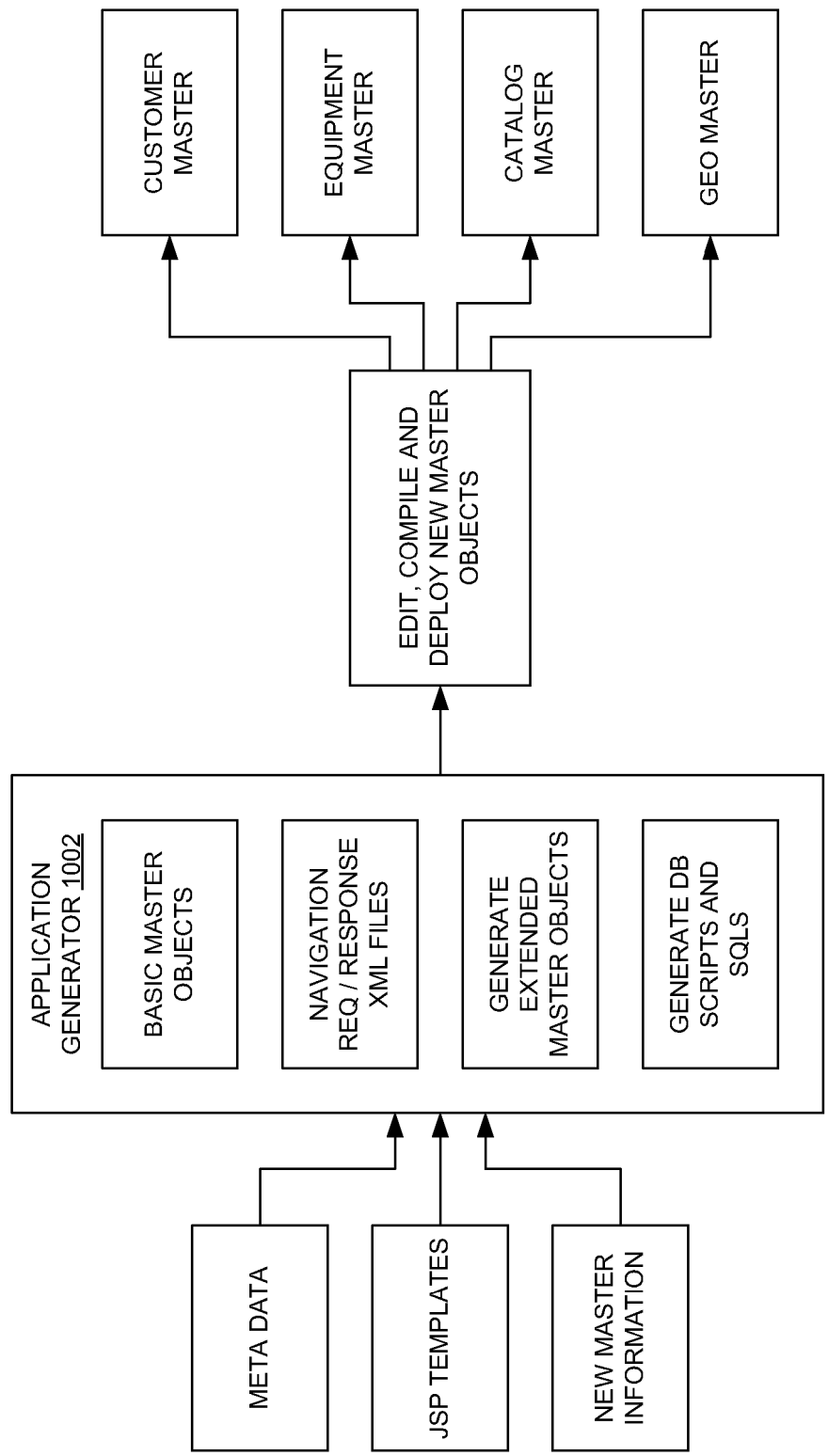
FIG. 10 illustrates an architectural view of an application generator system, according to one embodiment.

FIG. 10 illustrates an architectural view of an application generator system 1002, according to one embodiment. The application generator system 1002 generates screens automatically for manual correction of data, during the process of data migration, using data migration factory (DMF) tools. The application generator system 1002 allows a user to specify screen components such as check box and drop down buttons.

Further, the user may specify values for drop down from look up tables. The DMF tool also provides additional functionality to help build the relationship between the tables on primary keys as well as any other arbitrary relationship that may be required to support the particular business data object view. Once the user completes the configuration, the look and feel of the screens may be previewed. Also, at any point in time, the user may view and modify look and feel of the auto generated screens. Normally, for creating the user interface (UI) of a screen with 500 fields, at least one developer and 80 to 120 hours of time effort may be required. However, by using the DMF tools, this is reduced by approximately 95% of the typical effort and cost.

Figure 11:
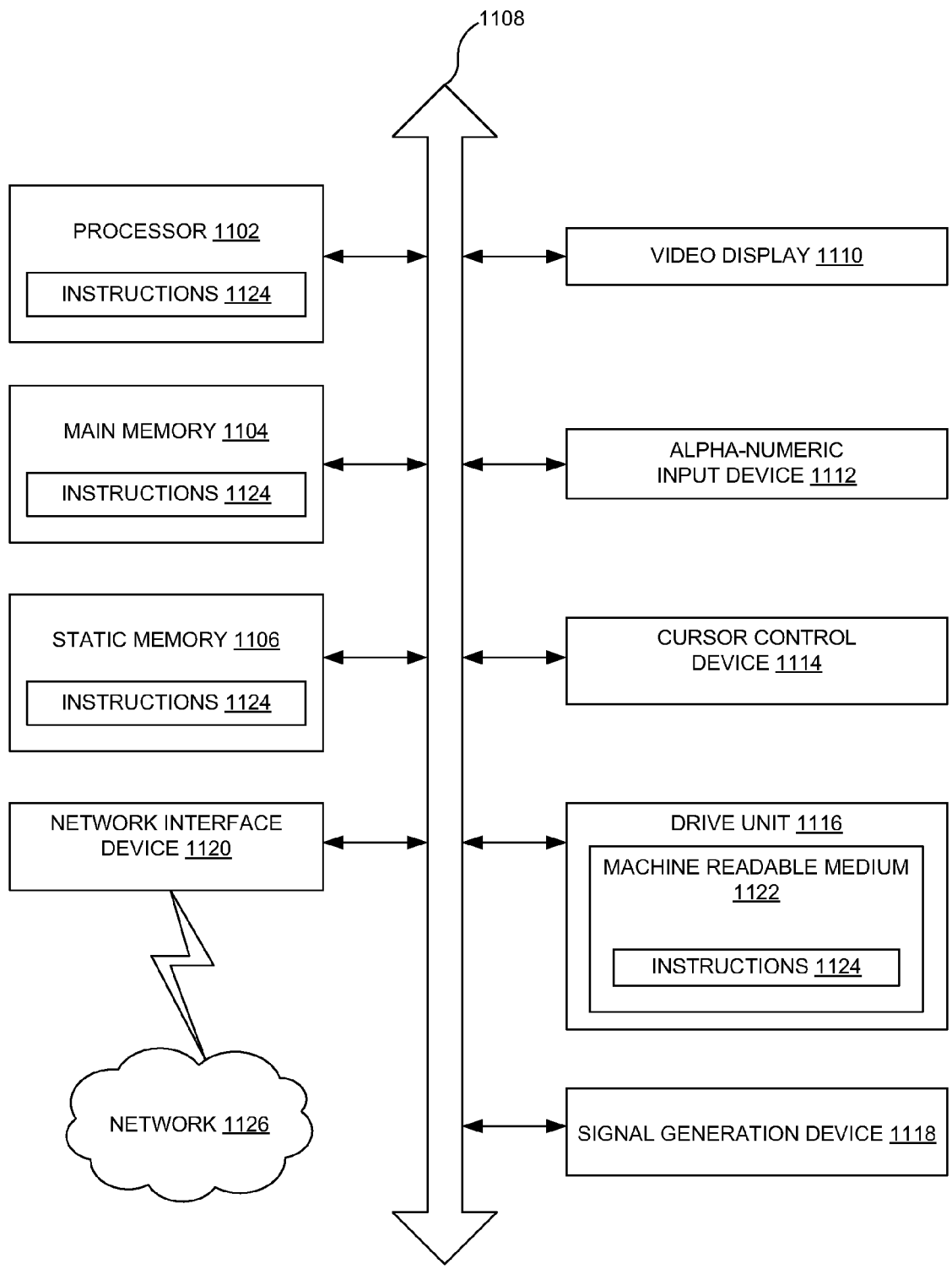
FIG. 11 is a diagrammatic system view of a data processing system in which any of the embodiments disclosed herein may be performed, according to one embodiment.

FIG. 11 is a diagrammatic system view of a data processing system in which any of the embodiments disclosed herein may be performed, according to one embodiment. Particularly, the diagrammatic system view of FIG. 11 illustrates a processor 1102, a main memory 1104, a static memory 1106, a bus 1108, a video display 1110, an alpha-numeric input device 1112, a cursor control device 1114, a drive unit 1116, a signal generation device 1118, a network interface device 1120, a machine readable medium 1122, instructions 1124 and a network 1126.

The diagrammatic system view 1100 may indicate a personal computer and/or a data processing system in which one or more operations disclosed herein are performed. The processor 1102 may be a microprocessor, a state machine, an application specific integrated circuit, a field programmable gate array, etc. The main memory 1104 may be a dynamic random access memory and/or a primary memory of a computer system. The static memory 1106 may be a hard drive, a flash drive, and/or other memory information associated with the data processing system.

The bus 1108 may be an interconnection between various circuits and/or structures of the data processing system. The video display 1110 may provide graphical representation of information on the data processing system. The alpha-numeric input device 1112 may be a keypad, keyboard and/or any other input device of text (e.g., a special device to aid the physically handicapped). The cursor control device 1114 may be a pointing device such as a mouse. The drive unit 1116 may be a hard drive, a storage system, and/or other longer term storage subsystem.

The signal generation device 1118 may be a bios and/or a functional operating system of the data processing system. The network interface device 1120 may perform interface functions (e.g., code conversion, protocol conversion, and/or buffering) required for communications to and from the network 1126 between a number of independent devices (e.g., of varying protocols). The machine readable medium 1122 may provide instructions on which any of the methods disclosed herein may be performed. The instructions 1124 may provide source code and/or data code to the processor 1102 to enable any one or more operations disclosed herein.

For example, the storage medium having instructions, that when executed by a computing platform, results in execution of a method of providing a data migration factory framework 105 including staging data associated with a legacy system 110, mapping the data, integrating at least one commercial tool (e.g., a commercial tool, an ETL tool, a commercial cleansing tool, a commercial profiling tool, Java-based components, an open source tool, a custom-coded tool, etc.) to facilitate migration of the data, viewing and correcting records associated with the data, and moving the records from the legacy system 110 to a target system 115.

In some embodiments, the staging data associated with the legacy system 110 includes discovering and identifying issues associated with data migration, defining a combination of locations, servers, and data migration objects, managing the data migration objects, extracting data from a source, initially and incrementally loading the data into a staging area, and enabling history tracking for incremental data processing.

In some embodiments, the mapping the data includes mapping data between a legacy system 110 and a target system 115, managing legacy structures, target structures, and hierarchies, mapping object level data, defining transformation rules associated with the data, providing an interface associate with mapping management and version control, and exporting the data mappings into a predetermined format.

In some embodiments, the correcting records associated with the data includes describing and configuring legacy migration elements and target structures at an object level, viewing and editing the records, auditing and tracking changes to the data, generating data quality and processing metrics, and integrating the records and at least one commercial tool.

Figure 12:
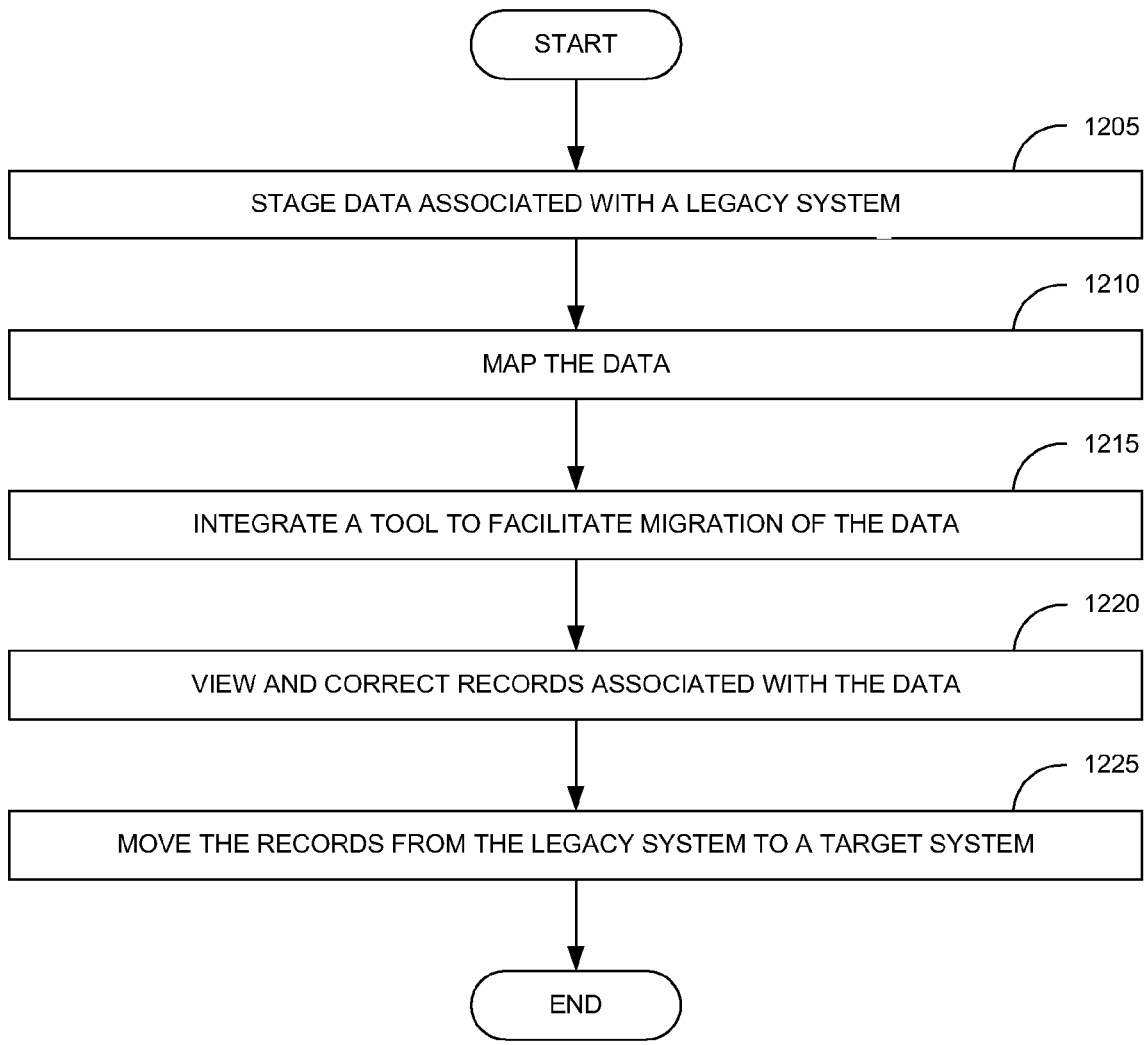
FIG. 12 is a process flow of providing a data migration factory framework, according to one embodiment.

FIG. 12 is a process flow of providing a data migration factory framework 105, according to one embodiment. In operation 1205, data associated with a legacy system 110 is staged. In some embodiments, the staging data associated with the legacy system 110 includes discovering and identifying issues associated with data migration, defining a combination of locations, servers, and data migration objects, managing the data migration objects, extracting the data from a source, initially and incrementally loading the data into a staging area and enabling history tracking for incremental data processing.

In operation 1210, the data is mapped. In some embodiments, mapping the data includes mapping the data between the legacy system 110 and a target system 115, managing legacy structures, target structures, and hierarchies, mapping object level data, defining transformation rules associated with the data, providing an interface (e.g., includes a web graphic user interface) associated with mapping management and version control, and exporting the data mappings into a predetermined format. For example, the predetermined format includes an Excel format (or spreadsheet-like format) and a tab delimited format.

In operation 1215, at least one tool is integrated to facilitate migration of the data. In some embodiments, the tool includes a commercial tool, an ETL tool, a commercial cleansing tool, a commercial profiling tool, Java-based components, an open source tool and a custom-coded tool.

In operation 1220, records associated with the data are viewed and corrected. In some embodiments, the correcting records associated with the data includes describing and configuring legacy migration elements and target structures at an object level, viewing and editing the records, auditing and tracking changes to the data, generating data quality and processing metrics, and integrating the records and the tool. In operation 1225, the records are moved from the legacy system 110 to the target system 115.

The above-described data factory approach establishes repeatable and reusable data migration processes. Further, the data factory approach automates manual data correction process and reduces data migration effort in the legacy environment up to 50%. The above-described method facilitates cost reduction through optimized resource management and defect reduction by upfront identification and correction of data defects. Cycle time is also reduced by eliminating defect-analyze-fix-reload iterations and enables continuous improvement through metrics. In addition, the above-described data factory approach supports large scale parallel rollouts, resulting into faster results. The risk is low as the data is visible and tracked centrally by various business teams using graphical user interface (GUI) of the data management web application. Further, the above-described data migration solution is scalable and is leveraged across multiple sites and lines-of-business (LOBs).

Although the present embodiments have been described with reference to specific example embodiments, it will be evident that various modifications and changes may be made to these embodiments without departing from the broader spirit and scope of the various embodiments. For example, the various devices, engines, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of data migration from at least one legacy system to at least one target system in enterprise systems, comprising:
   staging data associated with the at least one legacy system, wherein the data comprises relationship between tables on primary keys and other arbitrary relationship required to support a particular business data object and different business views of the particular business data object, and wherein staging the data comprises:
   extracting the data from the at least one legacy system;
   initially and incrementally loading the data into a staging area; and
   enabling history tracking of cleansed and edited data in a business view after incrementally loading the data into the staging area;
   mapping the data between the at least one legacy system and the at least one target system at an object level to reduce data migration errors;
   integrating at least one tool to facilitate migration of the data;
   viewing and correcting records associated with the data by automatically generating graphical user interface (GUI) screens, wherein viewing and correcting records comprises enabling verification of changes made manually to a specific record and providing an option to rollback to one of the previous versions of the specific record; and
   moving the corrected records from the at least one legacy system to the at least one target system.

2. The method of claim 1, wherein the staging data associated with the at least one legacy system comprises:
   discovering and identifying issues associated with the data migration;
   defining at least one combination of locations, servers, and data migration objects; and
   managing the data migration objects.

3. The method of claim 1, wherein the mapping the data between the at least one legacy system and the at least one target system comprises:
   managing legacy structures, target structures, and hierarchies;
   mapping object level data;
   defining transformation rules associated with the data;
   providing an interface associated with mapping management and version control; and
   exporting the data mappings into at least one predetermined format.

4. The method of claim 3, wherein the interface comprises a web graphic user interface.

5. The method of claim 3, wherein the predetermined format comprises at least one element selected from the group consisting essentially of an Excel format and a tab delimited format.

6. The method of claim 1, wherein the at least one tool is selected from the group consisting essentially of a commercial tool, an ETL tool, a commercial cleansing tool, a commercial profiling tool, Java-based components, an open source tool and a custom-coded tool.

7. The method of claim 1, wherein the correcting records associated with the data comprises:
describing and configuring legacy migration elements and target structures at an object level;
viewing and editing the records;
auditing and tracking changes to the data;
generating data quality and processing metrics; and
integrating the records and at least one tool.

8. The method of claim 1, further comprising providing an option to playback previous corrections of the specific record.

9. The method of claim 1, further comprising enabling controlled management of correcting the records by granting role based privileges.

10. A system for data migration from at least one legacy system to at least one target system in enterprise systems comprising:
a processor;
a memory coupled to the processor, wherein the memory includes:
a data staging module to stage data associated with the at least one legacy system, wherein the data comprises relationship between tables on primary keys and other arbitrary relationship required to support a particular business data object and different business views of the particular business data object, and wherein the data staging module comprises:
an extraction module to extract the data from the at least one legacy system;
a load module to initially and incrementally load the data into a staging area; and
a track module to enabling history tracking of cleansed and edited data in a business view after incrementally loading the data into the staging area;
a data mapping module to map the data between the at least one legacy system and the at least one target system at an object level to reduce data migration errors;
an integrated toolset having at least one tool to facilitate migration of the data;
a data correction and governance module to view and correct records associated with the data by automatically generating graphical user interface (GUI) screens, wherein viewing and correcting records comprises enabling verification of changes made manually to a specific record and providing an option to rollback to one of the previous versions of the specific record; and
a moving module to move the corrected records from the at least one legacy system to the at least one target system.

11. The system of claim 10, wherein the data staging module associated with the at least one legacy system comprises:
an issue module to discover and identify issues associated with the data migration;
a definition module to define at least one combination of locations, servers, and data migration objects; and
a management module to manage the data migration objects.

12. The system of claim 10, wherein the data mapping module comprises:
a systems module to map the data between the at least one legacy system and the at least one target system;
a target module to manage target structures and hierarchies;
a management module to manage legacy structures, target structures, and hierarchies;
an object module to map object level data;
a rules module to define transformation rules associated with the data;
an interface module to provide an interface associated with mapping management and version control; and
an export module to export the data mappings into at least one predetermined format.

13. The system of claim 12, wherein the interface comprises a web graphic user interface.

14. The system of claim 12, wherein the predetermined format comprises at least one element selected from the group consisting essentially of an excel format and a tab delimited format.

15. The system of claim 10, wherein the integrated tool set comprises at least one element selected from the group consisting essentially of a commercial tool, an ETL tool, a commercial cleansing tool, a commercial profiling tool, Java-based components, an open source tool and a custom-coded tool.

16. The system of claim 10, wherein the data correction and governance module comprises:
a description and configuration module to describe and configure legacy migration elements and target structures at an object level;
a records module to view and edit the records;
a changes module to audit and track changes to the data;
a metrics module to generate data quality and processing metrics; and
an integration module to integrate the records and at least one tool.

17. An article comprising:
a non transitory computer readable storage medium having instructions, that when executed by a computing platform, result in execution of a method of providing a data migration factory framework for migrating data from at least one legacy system to at least one target system in enterprise systems comprising:
staging data associated with the at least one legacy system, wherein the data comprises relationship between tables on primary keys and other arbitrary relationship required to support a particular business data object and different business views of the particular business data object, and wherein staging the data comprises:
extracting the data from the at least one legacy system;
initially and incrementally loading the data into a staging area; and
enabling history tracking of cleansed and edited data in a business view after incrementally loading the data into the staging area;
mapping the data between the at least one legacy system and the at least one target system at an object level to reduce data migration errors;
integrating at least one commercial tool to facilitate migration of the data;
viewing and correcting records associated with the data by automatically generating graphical user interface (GUI) screens, wherein viewing and correcting records comprises enabling verification of changes made manually to a specific record and providing an option to rollback to one of the previous versions of the specific record; and moving the corrected records from the at least one legacy system to the at least one target system.

18. The article of claim 17, wherein the staging data associated with the at least one legacy system comprises:
   discovering and identifying issues associated with the data migration;
   defining at least one combination of locations, servers, and data migration objects; and
   managing the data migration objects.

19. The article of claim 17, wherein the mapping the data between the at least one legacy system and the at least one target system comprises:
   managing legacy structures, target structures, and hierarchies;
   mapping object level data;
   defining transformation rules associated with the data;
   providing an interface associate with mapping management and version control; and
   exporting the data mappings into at least one predetermined format.

20. The article of claim 17, wherein the at least one tool is selected from a group consisting essentially of a commercial tool, an ETL tool, a commercial cleansing tool, a commercial profiling tool, Java-based components, an open source tool and a custom-coded tool.

21. The article of claim 17, wherein the correcting records associated with the data comprises:
   describing and configuring legacy migration elements and target structures at an object level;
   viewing and editing the records;
   auditing and tracking changes to the data;
   generating data quality and processing metrics; and
   integrating the records and at least one commercial tool.

* * * * *